United States Patent [19]

Peters, Jr. et al.

[11] 4,068,235
[45] Jan. 10, 1978

[54] FREQUENCY DIVERSITY RADAR SYSTEM

[75] Inventors: Philip H. Peters, Jr., Schenectady; Donald A. Wilbur, Albany, both of N.Y.

[73] Assignee: The United States of America as represented by the Secretary of the Army, Washington, D.C.

[21] Appl. No.: 490,702

[22] Filed: Feb. 25, 1955

[51] Int. Cl.$^2$ .............................................. G01S 9/23
[52] U.S. Cl. ................................................ 343/17.2 R
[58] Field of Search ...................... 250/7.3, 9, 18, 13, 250/15, 20, 33 LG, 27 V; 343/17.1, 17.2, 17.2 R

[56] References Cited

U.S. PATENT DOCUMENTS

| | | | |
|---|---|---|---|
| 3,163,862 | 12/1964 | Jenny | 343/17.2 R X |
| 3,179,935 | 4/1965 | Blass | 343/17.2 R X |
| 3,324,469 | 6/1967 | Szerlir | 343/17.2 R |
| 3,603,995 | 9/1971 | Howard | 343/17.2 R X |
| 3,858,219 | 12/1974 | Hull | 343/17.2 R |
| 3,866,224 | 2/1975 | Porter et al. | 343/17.2 R |
| 3,981,012 | 9/1976 | Brault et al. | 343/17.2 R X |
| 4,038,659 | 7/1977 | Hamer et al. | 343/17.2 R X |

Primary Examiner—T. H. Tubbesing
Attorney, Agent, or Firm—Jeremiah G. Murray; Sheldon Kanars

EXEMPLARY CLAIM

1. A frequency diversity radar transmission system comprising a source of recurring periodic pulses, a magnetron type oscillator adapted to be voltage tuned for generating continuous waves of radio-frequency energy, means responsive to said pulses for voltage tuning said magnetron whereby the continuous wave output frequency of the magnetron is instantaneously shifted to successive discrete frequencies by successive pulses and the respective discrete frequencies are maintained constant for the period between any two successive pulses, a transmitting antenna, wideband amplifier means driven by the output of said magnetron and having its output coupled to said antenna, and means for periodically energizing said amplifier immediately after each of said successive shifts in frequency whereby radio-frequency pulse energy is coupled through said amplifier to said transmitting antenna only for a relatively small fraction of the period of said recurring pulses, each of the transmitted pulses comprising discrete frequencies.

9 Claims, 3 Drawing Figures

INVENTORS
DONALD A. WILBUR
PHILIP H. PETERS JR.
BY
*Harry M. Saragovitz*
ATTORNEY

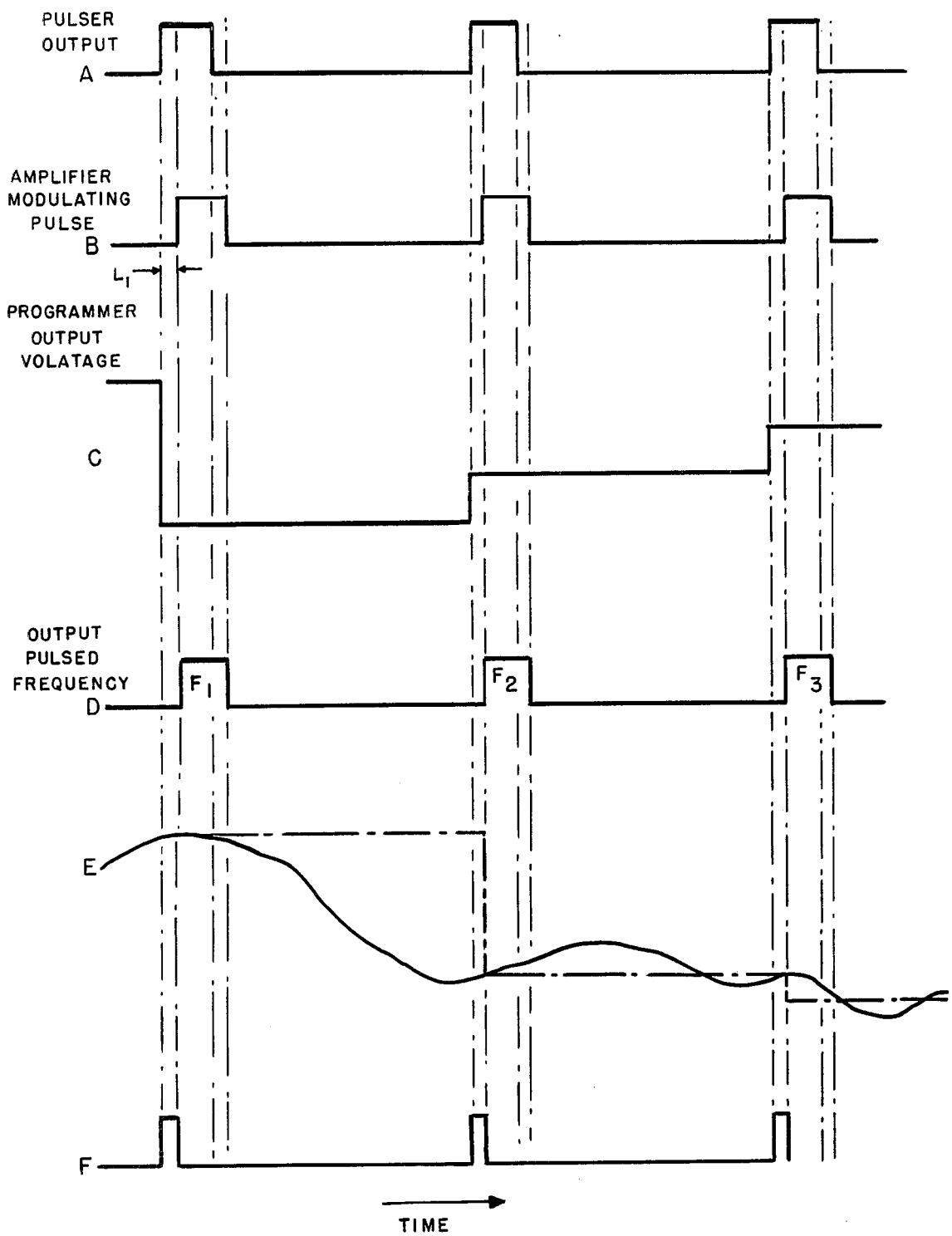

FREQUENCY DIVERSITY RADAR SYSTEM

This invention relates to radar systems and particularly to frequency diversified radar systems of the pulse echo type.

Various systems have been proposed to overcome the effects of interfering signals such as jamming signals or unintentional signals from other transmitters. In such systems, it is desirable to rapidly vary the operating frequency, preferably in a random manner over a wide frequency range. The advantage of such a system is that any equipment used to jam it must either give a continuous coverage of the entire operating range of the radar or it must anticipate the variation in frequency.

It is therefore an object of the present invention to provide an improved method and means for reducing the effects of jamming signals.

It is another object of the invention to provide a frequency diversity radar system wherein the operating frequency of the radar is instantaneously shifted in any desired manner over a wide range of frequencies.

In accordance with the present invention, there is provided a frequency diversity radar system comprising a source of recurring periodic pulses and a magnetron oscillator adapted to be voltage tuned for generating continuous waves of radio-frequency energy. Also included are means responsive to the recurring pulses for voltage tuning the magnetron whereby the continuous wave output frequency of the magnetron is instantaneously shifted to successive discrete frequencies by successive pulses, a transmitting antenna, and a gated wideband amplifier, preferably a traveling wave tube amplifier driven by the output of the magnetron and having its output coupled to the antenna. Means are also included for periodically energizing or gating the amplifier for an interval of prescribed duration a fixed time after each of the successive shifts in frequencies whereby radio-frequency pulse energy is coupled through said amplifier to the antenna only for a relatively small fraction of the period of the recurring signals. Further included as a radar receiver adapted to receive echo signals and including means for converting the received signals to a prescribed IF frequency, means for combining the output frequency of the magnetron with the IF frequency to generate the local oscillator frequency which is fed to the receiver, and means responsive to the recurring pulses for periodically deactivating the receiver just prior to the transmission of a pulse for an interval having a duration corresponding in time to the fixed time plus the duration of the transmitted pulse. The frequency shifts in the output of the magnetron occur only between the time no signal is transmitted or received.

For a better understanding of the invention, together with other and further objects thereof, reference is had to the following description taken in connection with the accompanying drawings in which:

FIG. 3 illustrates a series of explanatory curves.

Figure 1:
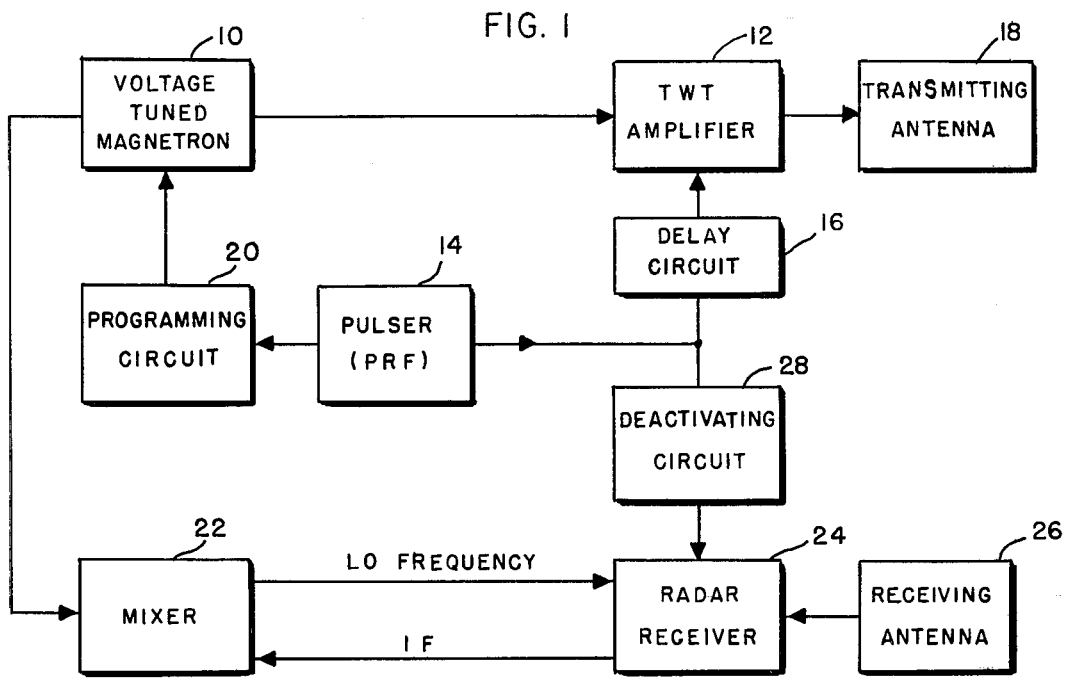
FIG. 1 is a block diagram of one embodiment of the present invention.

In the system shown in FIG. 1, 10 represents an oscillator of the magnetron type adapted to be voltage tuned whereby the output frequency is tuned or modulated over a wide range by varying the magnitude of the unidirectional voltage applied to the magnetron anode. One such magnetron oscillator is described in our patent application Ser. No. 360,328, filed June 8, 1953, now U.S. Pat. No. 3,201,712. It has been found that the operating frequency of such a voltage tuned magnetron can be shifted over frequency ranges in excess of one and one-half to one in ratio as rapidly as the unidirectional magnetron anode voltage can be changed. The output of magnetron oscillator 10 drives a wide bandpass amplifier 12, preferably a traveling wave tube type amplifier which is periodically pulsed into operation by the output from a pulser source 14 through delay network 16. The parameters of traveling wave tube amplifier 12 are so chosen that it will suitably amplify the wide range of frequencies through which magnetron 10 is to be tuned. Such tubes are so well known that no detailed description thereof is believed necessary. Pulser 14 may comprise any one of the well known circuits utilized in conventional radar pulse-echo systems to provide recurring pulses at the radar pulse repetition frequency which is selected in the usual manner in accordance with the range of distances to be covered by the radar system. As shown, the output of amplifier 12 is fed to a conventional radar transmitting antenna 18.

The frequency tuning voltage is applied to the anode of magnetron 10 by means of a suitable programming circuit 20 which is triggered by the output from pulser 14 to generate a direct-current voltage output varying in the forms of steps as a function of time. One such circuit is illustrated on page 294 of Volume 19, "Wave Forms," of the M.I.T. Radiation Laboratory Series. Programming circuit 20 is so arranged and constructed that for each recurring pulse applied thereto, the magnitude of the amplitude level of the tuning voltage applied to the anode of magnetron 10 will be instantaneously shifted, but the voltage level between any two successive recurring pulse signals will remain constant. Thus, effectively, magnetron 10 may be considered to be a C-W oscillator, the output frequency energy of which is at one constant value for the period between a pair of successive recurring pulses and at other discrete constant values for the period between any other pair of successive recurring pulses. The output of magnetron 10 thus drives traveling wave tube amplifier 12 which is periodically pulsed into operation through delay circuit 16 at the pulse repetition frequency rate to feed pulsed microwave energy to transmitting antenna 18, each transmitted pulse differing in frequency from the preceding one. The frequency of successive over a wide range of frequencies and be made to correspond to any desired schedule as deterined by the output of programming circuit 20. If a random schedule is desired, the programming circuit may be controlled by a noise generator which would make the transmitted frequency vary from pulse to pulse in a completely unpredictable manner.

To facilitate reception of target echos, the output of magnetron 10 is fed to a crystal mixer stage 22 to which is also supplied the IF frequency from a conventional superheterodyne radar receiver 24. For any given constant frequency output of magnetron 10, the output of mixer stage 22 will provide either the sum or difference of the constant magnetron oscillator frequency and the IF frequency from receiver 24. Either one of these frequencies may be applied to receiver 24 as the local oscillator frequency which will beat with the incoming frequency from receiving antenna 26 to generate the IF frequency which is detected in the receiver to provide the target echo. Thus, as the transmitted frequency is shifted, the local oscillator frequency is properly related to that of successive transmitted pulses. The output of pulser 14 is applied to receiver 24 through a suitable deactivating circuit 28 to synchronize the end of the reception interval with the beginning of each period of rapid frequency shift of magnetron 10 and to maintain the receiver inoperative for the duration of the transmitted pulse periodically amplified in traveling wave tube 12 and fed to transmitting antenna 18. It is to be understood, of course, that other well known means may be utilized to provide a local oscillator frequency to receiver 24. For example, the output of programming circuit 20 may be applied to control a low power voltage tuned magnetron for use as a receiver local oscillator so that the receiver will then track the transmitter.

Figure 2:
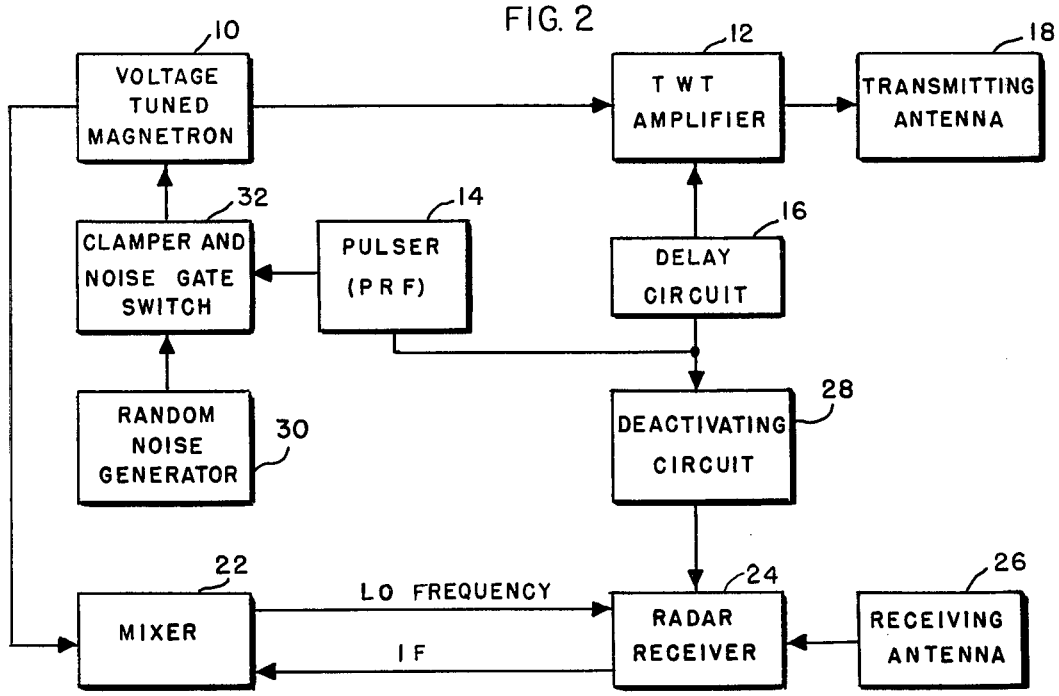
FIG. 2 is a block diagram of another embodiment of the invention.

FIG. 2 illustrates a system wherein the instantaneous magnetron frequency variation or shift is randomly achieved by utilizing a low-frequency noise generator as the programming device. As shown, the programming circuit 20 of FIG. 1 has been replaced by a random noise generator 30 and a clamper noise gate switch stage 32 which is controlled by the output of pulser 14. By applying the noise through a suitable clamping device, the noise voltage applied to the magnetron 10 may be maintained constant during a period of transmission and for the corresponding duration of reception. The noise voltage would then vary in a random fashion to a new voltage level at which magnetron 10 will transmit at a new frequency which remains constant until the next transmitted pulse, etc. Suitable means well known in the art may be provided for actuating the noise generator at the end of the reception interval and cutting it off at the beginning of the transmission interval. The duration of noise generation is therefore determined by the delay provided for in delay circuit 16. The rest of the components of the system shown in FIG. 2 are identical to those illustrated in FIG. 1.

To better understand the operation of the frequency diversity radar system shown in FIGS. 1 and 2, reference is made to the curves shown in FIG. 3. The pulses shown at A represent the recurring periodic output pulses from pulser 14. These pulses are applied through delay circuit 16 as energizing pulses to traveling wave tube amplifier 12 and are shown at B with the time of delay being designated by the duration $t_1$. The step output voltage of programming circuit 20 is illustrated at C. As shown, the successive step voltages are shifted to discrete amplitude level in synchronism with the leading edge of successive recurring pulses with the magnitude of the amplitude of the step voltage remaining constant at one level between any two successive recurring pulses, but the amplitude voltage level changing from pulse to pulse. It can thus be seen that the output of programming circuit will frequency tune magnetron 10 through a very wide range. For convenience, these frequencies have been labeled $F_1$, $F_2$, $F_3$, etc, as illustrated in curve D. The pulsed frequency energy output transmitted by antenna 18 is fed by traveling wave tube amplifier 12 which, in turn, is driven by magnetron 10. Receiver 24 is deactivated for the period corresponding to the delay time plus the duration of the transmitted pulse. Hence it is readily apparent from curves B, C, and D that the sytem is frequency modulated only during a short period of time during which no pulse is transmitted or received.

For a random frequency schedule, reference is made to curves E and F of FIG. 3. The solid line shown in curve E represents the output of the noise random generator 30 illustrated in FIG. 2. Curve F illustrates the gating switch pulses applied from generator 30 of FIG. 2 to couple the noise energy voltage to the magnetron 10. By use of suitable clamping arrangement, the noise voltage applied to magnetron 10 may be kept constant between gating pulses as shown by the dashed line of curve E. Thus, magnetron 10 may be tuned at a random schedule with each transmitted pulse differing in frequency from the preceding one.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A frequency diversity radar transmission system comprising a source of recurring periodic pulses, a magnetron type oscillator adapted to be voltage tuned for generating continuous waves of radio-frequency energy, means responsive to said pulses for voltage tuning said magnetron whereby the continuous wave output frequency of the magnetron is instantaneously shifted to successive discrete frequencies by successive pulses and the respective discrete frequencies are maintained constant for the period between any two successive pulses, a transmitting antenna, wideband amplifier means driven by the output of said magnetron and having its output coupled to said antenna, and means for periodically energizing said amplifier immediately after each of said successive shifts in frequency whereby radio-frequency pulse energy is coupled through said amplifier to said transmitting antenna only for a relatively small fraction of the period of said recurring pulses, each of the transmitted pulses comprising discrete frequencies.

2. The system in accordance with claim 1 wherein said wideband amplifier means comprises a traveling wave tube amplifier.

3. A frequency diversity radar system comprising a source of recurring periodic pulses, a radar receiver adapted to receive and detect echo signals, a magnetron type oscillator adapted to be voltage tuned for generating continuous waves of radio-frequency energy, means responsive to pulses for voltage tuning said magnetron whereby the continuous wave output frequency of the magnetron is instantaneously shifted to successive discrete frequencies by successive pulses and the respective discrete frequencies are maintained constant for the period between any two successive pulses, a transmitting antenna, a wideband amplifier adapted to be driven by said magnetron and having its output coupled to said antenna, means for periodically energizing said amplifier for a prescribed interval a fixed time after each of said successive shifts in frequency whereby radio-frequency pulse energy is coupled through said amplifier to said transmitting antenna only for a relatively small fraction of the period of said recurring signals, each of the transmitted pulses comprising discrete frequencies, and means responsive to said recurring pulses for periodically deactivating said receiver just prior to the transmission of each pulse for a period corresponding in duration to said interval plus said fixed time, said frequency shifts of said magnetron occurring only between the time no signal is transmitted or received.

4. A frequency diversity radar system comprising a source of recurring periodic pulses, a magnetron type oscillator adapted to be voltage tuned for generating continuous waves of radio-frequency energy, means responsive to said pulses for voltage tuning said magnetron wherby the continuous wave output frequency of the magnetron is instantaneously shifted to successive discrete frequencies by successive pulses and the respective discrete frequencies are maintained constant for the period between any two successive pulses, a transmitting antenna, wideband amplifier means driven by the output of said magnetron and having its output coupled to said antenna, means for periodically energizing said amplifier a prescribed interval a fixed time after each of said successive shifts in frequency whereby radio-frequency pulse energy is coupled through said amplifier to said antenna only for a relatively small fraction of the period of said recurring signals, a radar receiver adapted to receive echo signals and including means for converting said received signals to a prescribed IF frequency, means for combining the output frequency of said magnetron with said IF frequency to generate a local oscillator frequency, said local oscillator frequency being fed to said receiver, and means responsive to said recurring pulses for periodically deactivating said receiver just prior to the transmission of a pulse for a period corresponding in duration to said interval plus said fixed time, the frequency shifts in the output of said magnetron occurring only between the time no signal is transmitted or received.

5. The system in accordance with claim 4 wherein said fixed time is determined by a delay circuit connected between said recurring pulse source and said amplifier.

6. The system in accordance with claim 4 wherein said voltage tuning means comprises means for producing random noise voltages, means for periodically applying successive discrete amplitude levels of noise voltage to said magnetron in accordance with successive recurring pulses, and means for maintaining said discrete amplitude levels constant for successive periods of said recurring pulses.

7. The system in accordance with claim 1 wherein said voltage tuning means comprises means for producing random noise voltages, means for periodically applying successive discrete amplitude levels of noise voltage to said magnetron in accordance with successive recurring pulses, and means for maintaining said discrete amplitude levels constant for successive periods of said recurring pulses.

8. A frequency diversity radar transmission system comprising a source of recurring periodic pulses, a magnetron type oscillator adapted to be voltage tuned for generating continuous waves of radio frequency energy, means responsive to said pulses for voltage tuning said magnetron whereby the continuous wave output frequency of the magnetron is instantaneously shifted to successive discrete frequencies by successive pulses and maintained at a constant discrete value for the period between any two successive pulses, a transmitting antenna, amplifier means driven by the output of said magnetron and having its output coupled to said antenna, and means for periodically energizing said amplifier for prescribed intervals a fixed time after each of said successive shifts in frequency whereby radio-frequency pulse energy is coupled through said amplifier to said antenna only for a relatively small fraction of the period of said recurring signals.

9. The system in accordance with claim 8 wherein said fixed time is determined by a delay circuit connected between said recurring pulse source and said amplifier.

* * * * *